US00RE45665E

(19) United States
(12) Reissued Patent
Holley

(10) Patent Number: US RE45,665 E
(45) Date of Reissued Patent: *Sep. 8, 2015

(54) FLOW CONTROL ELEMENT INCLUDING ELASTIC MEMBRANE WITH PINHOLES

(75) Inventor: James W. Holley, Colorado Springs, CO (US)

(73) Assignee: Medela Holding AG, Baar (CH)

( * ) Notice: This patent is subject to a terminal disclaimer.

(21) Appl. No.: 11/700,903

(22) Filed: Jan. 31, 2007

Related U.S. Patent Documents

Reissue of:
(64) Patent No.: 6,991,122
Issued: Jan. 31, 2006
Appl. No.: 10/758,573
Filed: Jan. 13, 2004

U.S. Applications:
(63) Continuation-in-part of application No. 10/351,137, filed on Jan. 24, 2003, now Pat. No. 6,957,744.

(51) Int. Cl.
*A61J 11/00* (2006.01)
*B65D 47/20* (2006.01)
*B26F 1/24* (2006.01)

(52) U.S. Cl.
CPC ..... *A61J 11/001* (2013.01); *B26F 1/24* (2013.01); *B65D 47/20* (2013.01)

(58) Field of Classification Search
CPC ..... A61J 11/001; B65D 47/20; B26F 1/42
USPC ..... 215/11.1, 11.4, 11.5, 902, 247, 248, 215/262, 311, 385; 220/711, 714, 220/203.11–203.19, 366.1, 367.1; 30/368; 137/512.15, 587, 588, 849; 251/149.1
See application file for complete search history.

(56) References Cited

U.S. PATENT DOCUMENTS

| | | | | |
|---|---|---|---|---|
| 156,549 | A | 11/1874 | Dickinson | 215/11.1 |
| 1,683,246 | A | 9/1928 | Griffiths | 215/11.1 |
| 2,533,609 | A | 12/1950 | Nolan et al. | |

(Continued)

FOREIGN PATENT DOCUMENTS

| | | |
|---|---|---|
| DE | 3830448 A1 | 3/1990 |
| FR | 571788 | 5/1924 |

(Continued)

*Primary Examiner* — Sue A Weaver
(74) *Attorney, Agent, or Firm* — McDonnell Boehnen Hulbert & Berghoff LLP

(57) ABSTRACT

A flow control element (e.g., a baby bottle nipple or a child nippy cup flow control valve) that includes a tube-like wall section defining a flow channel, and a substantially flat membrane supported by the wall section such that membrane impedes flow through the flow channel to an external region. The membrane punctured to form multiple, substantially round pinholes arranged in a two-dimensional pattern that remain closed to prevent fluid flow under normal atmospheric conditions, and open and to facilitate fluid flow rate through the membrane under an applied pressure differential (e.g., when sucked on by a child). The wall section has a greater rigidity than the membrane (which is formed from a relatively highly elastic material). Different sized pinholes are produced using different sized pins, thereby facilitating different flow rates in response to different applied pressure differentials. The pinholes are generated while stretching the membrane in a radial direction.

18 Claims, 4 Drawing Sheets

(56) References Cited

U.S. PATENT DOCUMENTS

| | | | | | |
|---|---|---|---|---|---|
| 2,588,069 | A | | 3/1952 | Allen | 215/11.1 |
| 2,630,118 | A | * | 3/1953 | Casey | 215/11.4 |
| 2,630,932 | A | | 3/1953 | Lestakis | 215/11.1 |
| 2,708,421 | A | * | 5/1955 | Jauch | 119/71 |
| 2,812,092 | A | | 11/1957 | Witz | |
| 2,889,829 | A | | 6/1959 | Tannenbaum et al. | 606/236 |
| 3,047,950 | A | * | 8/1962 | Stasiuk | 30/368 |
| 3,086,549 | A | * | 4/1963 | Fino | 137/493 |
| 3,217,574 | A | * | 11/1965 | Nauta | 83/108 |
| 3,244,313 | A | | 4/1966 | Miles | |
| 3,319,837 | A | | 5/1967 | Mueller | |
| 3,424,218 | A | | 1/1969 | Vanderbur, Jr. et al. | |
| 3,532,242 | A | | 10/1970 | Tibbs | 215/11.1 |
| 3,840,153 | A | | 10/1974 | Devlin | |
| 4,010,861 | A | | 3/1977 | Welten | |
| 4,065,536 | A | | 12/1977 | Lucas | |
| 4,623,069 | A | | 11/1986 | White | |
| 4,676,386 | A | | 6/1987 | Phlaphongphanich | 215/11.1 |
| 4,685,577 | A | | 8/1987 | Chen | |
| 4,765,497 | A | * | 8/1988 | Hsu | 215/11.1 |
| 4,813,558 | A | | 3/1989 | Fujiyoshi | |
| 4,865,207 | A | | 9/1989 | Joyner et al. | |
| 4,895,264 | A | | 1/1990 | Phlaphongphanich | |
| 4,928,836 | A | * | 5/1990 | Wu et al. | 215/11.5 |
| 4,993,568 | A | | 2/1991 | Morifuji et al. | 215/11.1 |
| 5,071,017 | A | * | 12/1991 | Stull | 215/260 |
| 5,101,991 | A | | 4/1992 | Morifuji et al. | 215/11.1 |
| 5,186,347 | A | * | 2/1993 | Freeman et al. | 220/254.1 |
| 5,300,089 | A | | 4/1994 | Sassin | 606/236 |
| 5,410,814 | A | | 5/1995 | Caban | 30/368 |
| 5,499,729 | A | * | 3/1996 | Greenwood et al. | 215/11.5 |
| 5,542,670 | A | * | 8/1996 | Morano | 220/714 |
| 5,672,388 | A | * | 9/1997 | McHenry et al. | 427/255.26 |
| 5,833,085 | A | | 11/1998 | Valyi | |
| 5,842,076 | A | | 11/1998 | Glover et al. | |
| 6,042,850 | A | | 3/2000 | Ida et al. | 426/2 |
| 6,053,342 | A | * | 4/2000 | Chomik | 215/11.5 |
| 6,138,710 | A | | 10/2000 | Chomik et al. | |
| 6,161,710 | A | | 12/2000 | Dieringer et al. | 215/11.4 |
| 6,196,409 | B1 | * | 3/2001 | Lake et al. | 220/371 |
| D445,193 | S | | 7/2001 | Manganiello et al. | |
| 6,253,935 | B1 | | 7/2001 | Fletcher | 215/11.1 |
| 6,343,704 | B1 | | 2/2002 | Prentiss | 215/11.1 |
| 6,446,822 | B1 | | 9/2002 | Meyers et al. | |
| D465,028 | S | | 10/2002 | Renz | |
| 6,588,613 | B1 | | 7/2003 | Pechenik et al. | 215/11.1 |
| 6,601,720 | B2 | | 8/2003 | Meyers et al. | |
| 6,880,713 | B2 | * | 4/2005 | Holley, Jr. | 215/11.4 |
| 6,920,991 | B2 | | 7/2005 | Holley, Jr. | |
| 2002/0011583 | A1 | * | 1/2002 | Getzewich et al. | 251/342 |
| 2002/0063103 | A1 | | 5/2002 | Kiernan | 215/11.4 |
| 2002/0133132 | A1 | | 9/2002 | Copat et al. | |
| 2004/0045922 | A1 | | 3/2004 | Holley, Jr. | |

FOREIGN PATENT DOCUMENTS

| | | | | |
|---|---|---|---|---|
| FR | 2302724 | | | 10/1976 |
| GB | 2154451 | A | | 9/1985 |
| WO | WO 9203118 | A1 | * | 3/1992 |
| WO | 9911218 | A1 | | 3/1999 |
| WO | WO 9929278 | | * | 6/1999 |
| WO | WO 03045200 | A2 | * | 6/2003 |

* cited by examiner

FLOW CONTROL ELEMENT INCLUDING ELASTIC MEMBRANE WITH PINHOLES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

The present application is a continuation-in-part of U.S. patent application Ser. No. 10/351,137 filed by James W. Holley, Jr. on Jan. 24, 2003 *now U.S. Pat. No. 6,957,744*.

FIELD OF THE INVENTION

The present invention relates to fluid flow control devices for beverage containers, and more specifically it relates to "no drip" flow control elements for baby bottles and child sippy cups.

RELATED ART

Baby bottles and sippy cups represent two types of beverage containers that utilize flow control devices to control the ingestion of beverage in response to an applied sucking force. Baby bottle assemblies utilize nipples to pass baby formula or milk from the bottle to a child (i.e., infant or toddler) in response to a sucking force (pressure) applied by the child on the nipple. Sippy cups are a type of spill-resistant container typically made for children that include a cup body and a screw-on or snap-on lid having a drinking spout molded thereon. An inexpensive flow control element, such as a soft rubber or silicone outlet valve, is often provided on the sippy cup lid to control the flow of liquid through the drinking spout and to prevent leakage when the sippy cup is tipped over when not in use.

A problem associated with conventional baby bottle nipples is that, unlike natural female breasts, the quantity of formula/milk drawn through the nipple is relatively fixed, which causes a parent to periodically replace relatively low flow nipples with higher flow nipples as a child's feeding needs increase. Natural breasts generally adjust to a baby's sucking pressure so that its nutritional needs are met as it grows. When newborn, an infant's sucking force is relatively weak and its appetite is relatively small, so the female breast supplies a relatively low flow rate. As the infant grows into a toddler, its sucking force increases along with its appetite. Female breasts are able to adjust to this increased demand by providing a higher flow rate in response to the increased sucking force and appetite. Unlike breast-fed babies, bottle-fed babies often experience feeding related problems associated with conventional nipple products that exhibit substantially fixed milk flow rates. That is, many conventional nipples are provided with an opening that is sized to facilitate a relatively fixed amount of milk flow depending on the size of the baby. Nipples for newborn babies have relative small holes that support relatively low flow rates, while nipples for toddlers typically include relatively large holes or slits to facilitate greater flow rates. A problem arises when a baby's draw rate fails to match the particular nipple from which that baby is being fed. For example, when a newborn infant is fed from a toddler nipple, the high flow rate can result in choking and coughing. Conversely, when a toddler is presented with a newborn baby's nipple, the low flow rate can cause frustration. In many instances, parents experience a great deal of anxiety trying to match the correct nipple to a baby's ever-changing milk flow demand.

A problem associated with "no drip" flow control elements (i.e., sippy cup flow control valves and baby bottle nipples) that are formed by cutting or molding slits in elastomeric material is that these slits typically fail or become clogged over time, which results in undesirable leakage and/or failure. Such sippy cup flow control valves typically include a sheet of the elastomeric material located between the inner cup chamber and the drinking spout that defines one or more slits formed in an X or Y pattern. As a child tilts the container and sucks liquid through the drinking spout, the slits yield and the flaps thereof bend outward, thereby permitting the passage of liquid to the child. When the child stops sucking, the resilience of the causes the slits to close once more so that were the cup to be tipped over or to fall on the floor, no appreciable liquid would pass out the drinking spout. Similarly, some toddler nipples are formed by cutting or molding slits into the end of a silicone nipple that yield and open outward to pass formula or milk when a toddler tilts the bottle and applies a sucking force, and to close when the child stops sucking. The problem with such slit-type sippy cup valves and baby bottle nipples as is that the elastomeric material in the region of the slits can fatigue and/or become obstructed over time, and the resulting loss of resilience can cause leakage when the slit flaps fail to fully close after use. This failure of the slit flaps to close can be caused by any of several mechanisms, or a combination thereof. First, repeated shearing forces exerted at the end of each slit due to repeated use can cause tearing of the elastomeric material in this region, thereby reducing the resilient forces needed to close the slit flaps after use. Second, thermal cycling or mechanical cleaning (brushing) of the elastomeric material due, for example, to repeated washing, can cause the elastomeric material to become less elastic (i.e., more brittle), which can also reduce the resilience of the slit flaps. Third, solid deposits left by liquids passing through the slits can accumulate over time to impede the slit flaps from closing fully.

What is needed is a "no drip" flow control element for baby bottles and the like that automatically adjusts its fluid flow rate to the needs of a growing child. What is also needed is a flow control element that avoids the clogging and tearing problems associated with conventional slit-type elastic flow control elements.

SUMMARY

The present invention is directed to a flow control element (e.g., a baby bottle nipple or a child sippy cup flow control valve) that includes a tube-like wall section defining a flow channel, and a membrane supported in the flow channel such that membrane impedes flow through the flow channel to an external region. The membrane is formed from a suitable elastomeric material (e.g., soft rubber, thermoplastic elastomer, or silicone) that is punctured to form multiple, substantially round pinholes that remain closed to prevent fluid flow through the membrane and flow channel under normal atmospheric conditions (i.e., while the membrane remains non-deformed), thereby providing a desired "no drip" characteristic. In contrast, when subjected to an applied pressure differential (e.g., when sucked on by a child), the membrane stretches (deforms), thereby causing some or all of the pinholes to open and to facilitate fluid flow rate through the membrane. Because the amount that the pinholes open, and the associated fluid flow through the pinholes, is related to the applied pressure differential, the present invention provides a flow control element that automatically adjusts its fluid flow rate to the needs of a growing child. In addition, because the pinholes are substantially round, the pinholes resist the clogging and tearing problems associated with slit-type flow control elements.

According to an embodiment of the present invention, the membrane is substantially flat (planar) and arranged such that a force generated by the applied pressure differential is perpendicular to a plane defined by the non-deformed membrane. By providing a flat membrane, sufficient deformation of the membrane (and associated opening of the pinholes) is achieved in response to a relatively small sucking force (pressure). Formation of the pinholes is also easier when the membrane is flat.

According to an aspect of the invention, the pinholes are arranged in a spaced-apart, two-dimensional pattern (e.g., a diamond pattern), thereby maintaining a relatively balanced pressure on the membrane that resists tearing of the membrane material as a child's sucking force increases.

According to another aspect of the present invention, the wall section has a greater rigidity than the membrane (which is formed from a relatively highly elastic material) such that, when an applied pressure differential is generated between the fluid flow channel and the external region, the membrane undergoes a greater deformation than the wall section. This arrangement directs the applied flow pressure against the membrane to produce maximum deformation for a given applied sucking pressure.

According to another embodiment of the present invention, the pinholes are formed such a first group of pinholes opens at a lower applied pressure differential than a second group of pinholes, which open at a somewhat higher applied pressure. Such different sized pinholes produce relatively low flow rates at low sucking pressures (i.e., because larger pinholes open while smaller pinholes remain essentially closed), and substantially greater flow rates at high sucking pressures (i.e., because both large and small pinholes are opened), thereby facilitating the production of a baby bottle nipple that can be used throughout a child growth from infant to toddler.

According to another embodiment of the present invention, a flow control element including the wall section and elastic membrane described above is produced by stretching the elastic membrane in a radial direction, piercing the membrane using a pin, and then releasing the membrane such that the thus-produced pinhole closes. In one embodiment, stretching is performed inserting a base structure or other fixture into the wall section such that the wall section is pushed radially outward, thereby stretching the membrane. In another embodiment, two pins having different diameters are used to form the pinholes.

The present invention will be more fully understood in view of the following description and drawings.

DETAILED DESCRIPTION

Figure 1:
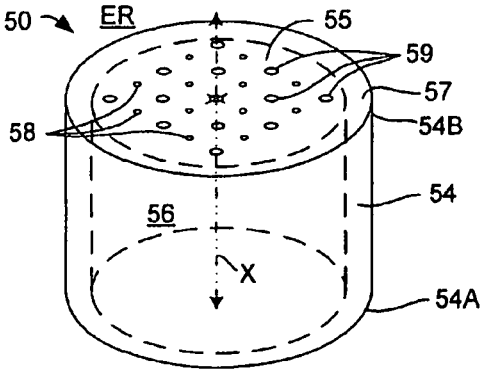
FIG. 1 is a perspective side view showing a flow control element according to a generalized embodiment of the present invention.
Figure 2A:
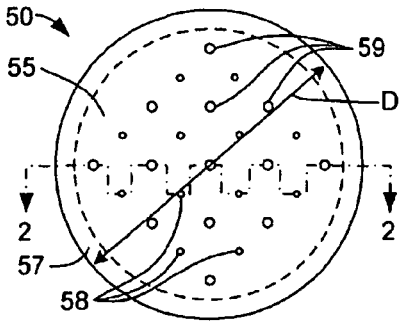
FIGS. 2(A) and 2(B) are top and cross-sectional side views, respectively, showing the flow control element of FIG. 1.
Figure 2B:
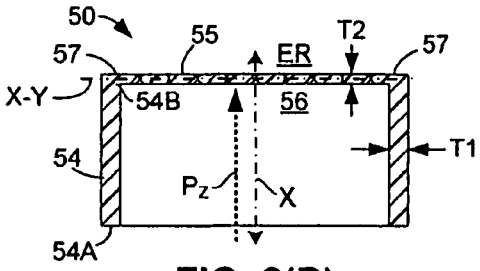

FIG. 1 is a perspective view showing a generalized flow control element 50 including a wall section 54 and a membrane 55. FIGS. 2(A) and 2(B) show flow control element 50 in top plan and cross-sectional side views, respectively, where FIG. 2(B) is taken along section line 2-2 of FIG. 2(A).

Wall section 54 is a tube-like structure defining a fluid flow channel 56 that extends generally along a central axis X between a lower (first) end 54A and an upper end 54B of wall section 54. As indicated in FIG. 2(A), in one embodiment wall section 54 has a circular cross section having a diameter D.

Membrane 55 is formed form a relatively elastic material and is connected to wall section 54 such that membrane 55 is disposed across fluid flow channel 56 to impede flow between fluid flow channel 56 and an external region ER (i.e., either from fluid flow channel 56 to external region ER, or from external region ER to fluid flow channel 56). In the disclosed embodiment, membrane 55 has a circular outer perimeter 57 that is secured to wall section 54, elastic membrane 55 is formed from a suitable material (e.g., soft rubber, thermoplastic elastomer, or silicone) having a thickness T2 in the range of 0.01 to 0.1 inches (more particularly, 0.02 to 0.05 inches). According to the present invention, membrane 55 defines a plurality of spaced-apart pinholes 58 and 59 formed using the procedure describe below such that when the membrane is subjected to normal atmospheric conditions and the membrane remains non-deformed, pinholes 58 and 59 remain closed to prevent fluid flow between fluid flow channel 56 and external region ER through membrane 55. As described in additional detail below, pinholes 58 and 59 are also formed such that when membrane 55 is deformed (stretched) in response to an applied pressure differential between fluid flow channel 56 and external region ER, pinholes 58 and 59 open to facilitate fluid flow through membrane 55. Accordingly, pinholes 58 and 59 facilitate adjustable fluid flow through membrane 55 that increases in direct relation to the applied pressure differential, thereby facilitating, for example, a baby bottle nipple that can be used throughout a child's development from infant to toddler.

Figure 3A:
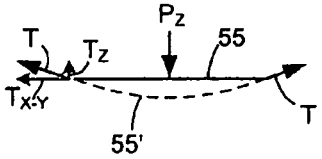
FIGS. 3(A) and 3(B) are simplified diagrams illustrating tensile forces generated in flat and curved membranes.
Figure 3B:
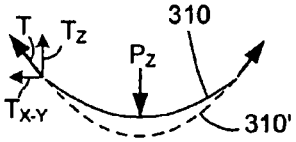

As indicated in FIG. 2(B), according to a preferred embodiment of the present invention, membrane 55 is substantially flat (planar) in its relaxed (i.e., non-deformed or unstretched) state, and lies in a plane X-Y that is perpendicular to central axis X defined by wall section 54. Two advantages are provided by making membrane 55 in this manner. A first advantage, which is illustrated by the simplified diagrams shown in FIGS. 3(A) and 3(B), is that a flat membrane is easier to stretch under an applied pressure than a curved membrane. In particular, as depicted in FIG. 3(A), a pressure $P_z$ applied perpendicular to substantially flat membrane 55 causes membrane 55 stretches (bows downward, as indicated by the dashed membrane 55'). Note that because membrane 55 is substantially flat, virtually all of the resultant tensile force T generated in membrane 55 is directed in the X-Y plane (indicated by component $T_{x-y}$), thereby generating little or no component $T_z$ in the Z-axis direction until the membrane is at least partially stretched. Because the tension component $T_z$ remains relatively small, planar membrane 55 is stretched (and the pinholes opened) in response to a relatively small applied pressure $P_z$, thereby facilitating fluid flow through membrane 55 in response to a relatively small sucking force. In contrast, as indicated in FIG. 3(B), a pre-curved membrane 310 generates a significantly larger tensile force component $T_z$, thereby requiring a substantially larger pressure $P_z$ to produce even a minimal stretching of membrane 310 from its resting position (e.g., as indicated by deformed membrane 310', shown in FIG. 3(B)). A second advantage to provided by making membrane 55 substantially flat is that, as described below, formation of the pinholes is greatly simplified and facilitated.

Although the preferred embodiment includes a substantially flat (planar) membrane, a curved membrane may also be used, although such membrane would necessarily be relatively thin (i.e., relative to a flat membrane formed from the same material) in order to facilitate a similar amount of deformation in response to an applied pressure. A problem posed by using a relatively thin membrane is the increased chance of rupture and/or tearing of the membrane material, which may result in the unintended ingestion of membrane material.

Referring to FIG. 2(A), according to an aspect of the present invention, membrane 55 defines a plurality of spaced-apart pinholes 58 and 59 that are arranged in a two-dimensional pattern. The term "spaced-apart" is used to indicate that the pinholes are separated by regions of non-perforated membrane material (i.e., there are no holes, cracks, slits, or other significant structural weaknesses in the membrane material in the regions separating adjacent pinholes). The spacing between pinholes 58 and 59 is selected based on the membrane material such that tearing of the membrane material between adjacent pinholes is avoided under normal operating conditions (i.e., the pinholes are spaced as far apart as is practical). Note that arranging pinholes 58 and 59 in a two-dimensional pattern provides the advantage of balancing the distribution of forces across membrane 55, thereby reducing the chance of tearing of the membrane material.

According to another aspect of the present invention, wall section wall section 54 has a greater rigidity than the membrane 55 such that, when an applied pressure differential is generated between fluid flow channel 56 and external region ER, membrane 55 undergoes a greater amount of deformation than wall section 54. In one embodiment, membrane 55 and wall section 54 are integrally molded from a suitable material (i.e., both hollow structure 54 and elastic membrane 55 are molded in the same molding structure using a single molding material, e.g., silicone, a thermoplastic elastomer, or soft rubber), and the increased rigidity is provided by forming wall section 54 to include a thickness T1 that is greater than the thickness of membrane 55. In an alternative embodiment, wall section 54 may be formed from a relatively rigid material (e.g., a hard plastic), and membrane 55 may be separately formed from a relatively elastic material and then secured to wall member 54.

Referring again to FIGS. 1 and 2(A), membrane 55 is depicted as being secured around its peripheral edge 57 to upper end 54B of wall section 54. As set forth in at least one specific embodiment provided below, membrane 55 may be alternatively be recessed into flow channel 56 to avoid damage caused, for example, by gumming or chewing on the end of flow control element 50. In yet other alternative embodiments, membrane 55 may located anywhere between lower end 54A and upper end 54B of wall section 54.

Figure 4A:
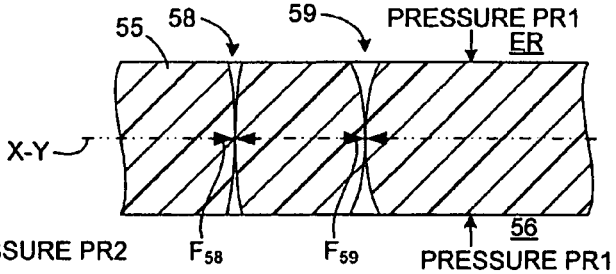
FIGS. 4(A), 4(B) and 4(C) are enlarged cross-sectional side views showing a portion of the membrane of the flow control element of FIG. 1 during operation.
Figure 4B:
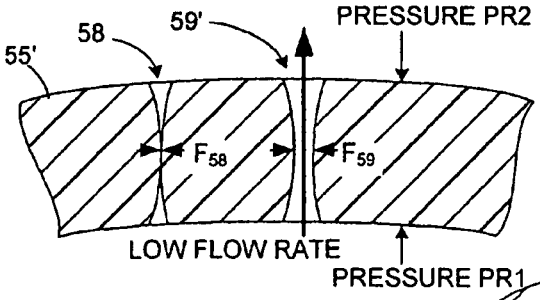
Figure 4C:
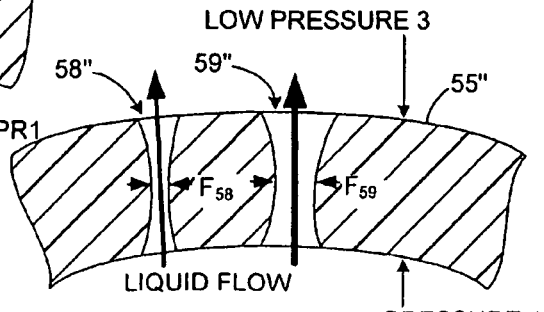

FIGS. 4(A) through 4(C) are enlarged cross-sectional side views depicting pinholes 58 and 59 under normal atmospheric conditions (FIG. 4(A)) and under applied pressure differential conditions (FIGS. 4(B) and 4(C)). Referring to FIG. 4(A), under normal atmospheric conditions (i.e., when a pressure PR1 exists both in fluid flow channel 56 and in external region ER), membrane 55 remains non-deformed (e.g., planar), and pinholes 58 and 59 remain closed to prevent fluid flow between fluid flow channel 56 and the external region ER through membrane 55. In contrast, as indicated in FIG. 4(B), when an applied pressure differential is generated (e.g., pressure PR1 exists in fluid flow channel 56, but a relatively low pressure PR2 is generated in external region ER, e.g., due to sucking), membrane 55 is deformed (i.e., stretched toward external region ER), and at least one of pinholes 58 and 59 is opened to facilitate fluid flow through membrane 55.

According to another embodiment of the present invention, pinholes 58 and 59 are formed, for example, using different sized pins (as described below) such that when membrane 55 is subjected to a relatively low applied pressure differential, pinholes 58 remain closed and pinholes 59 open to facilitate a relatively low fluid flow rate through membrane 55, and when membrane 55 is subjected to a relatively high applied pressure differential, both pinholes 58 and 59 open to facilitate a relatively high fluid flow rate through membrane 55. As indicated in FIG. 4(A), both holes 58 and 59 remain pinched closed under normal atmospheric conditions due to the elasticity of the membrane material. However, because holes 59 are formed using a larger pin than that used to form holes 58, the elastic closing force $F_{58}$ that pinches closed hole 58 is larger than the elastic closing force $F_{59}$ pinching closed hole 59. Accordingly, as shown in FIG. 4(B), a relatively small pressure differential deforms membrane 55' and overcomes the elastic closing force $F_{59}$ to open pinhole 59', but does not overcome the elastic closing force $F_{58}$ holding closed pinhole 58, thereby producing a relatively low fluid flow through deformed membrane 55'. As shown in FIG. 4(C), when a relatively large pressure differential is applied across membrane 55" that overcomes both elastic closing forces $F_{58}$ and $F_{59}$, both pinholes 58" and 59" open to producing a relatively high fluid flow through deformed membrane 55".

Figure 5:
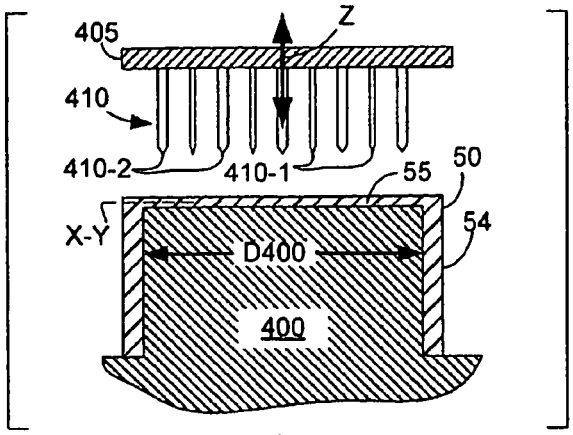
FIG. 5 is a simplified cross-sectional side view showing an apparatus for forming pinholes in the flow control element of FIG. 1.
Figure 6A:
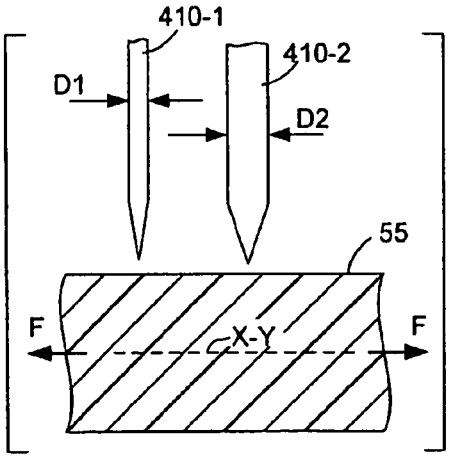
FIGS. 6(A), 6(B) and 6(C) are enlarged cross-sectional side views showing the membrane portion of FIG. 1 during the formation of pinholes using the apparatus of FIG. 5.
Figure 6B:
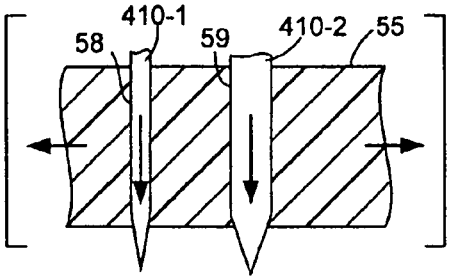
Figure 6C:
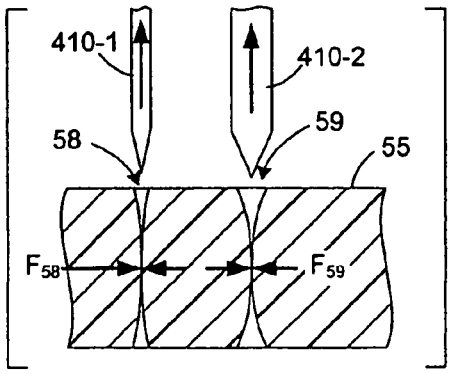

FIG. 5 is a simplified cross-sectional side view depicting an apparatus for generating pinholes in flow control element 50, and FIGS. 6(A) through 6(C) illustrate the process of forming the pinholes in membrane 55 according to another embodiment of the present invention.

Referring to FIG. 5, the apparatus includes a base structure 400 and a movable structure 405. Base structure 400 is shaped to fit inside of control element 50 in a manner that stretches wall section 54, thereby stretching elastic membrane 55 along its radial direction (i.e., along the plane X-Y). In the disclosed embodiment, base structure 400 has a diameter D400 that is 1% to 10% greater than the diameter D of wall section 54 (see FIG. 2(A)). Accordingly, as indicated in FIG. 6(A) when base structure 400 is press-fitted into wall section 54 (as shown in FIG. 5), a tensile force F is generated that stretches membrane 55 along plane X-Y such that it expands by 1% to 10% of its resting diameter.

Referring again to FIG. 5, extending from a lower surface of movable structure 405 are several pins 410 that are arranged in a predetermined pattern corresponding to the desired two-dimensional pinhole pattern (e.g., the diamond patter indicated in FIG. 2(A), which is described above). During operation, movable structure 405 is reciprocated in the Z direction such that pins 410 pierce membrane 55 to form pinholes. In a preferred embodiment, each pin 410-1 and pin 410-2 is formed with a continuously curved (e.g., circular) cross section such that each pinhole 158 and each pinhole 159 is substantially circular (i.e., does not have a slit or fold that would be formed by a cutting element having an edge). In addition, according to an embodiment of the present invention, different sized pins 410-1 and 410-2 are utilized to produce pinholes 58 and 59 in membrane 55. In particular, as indicated in FIG. 6(A), each pin 410-1 has a relatively small diameter D1, and each pin 410-2 has a relatively large diameter D2. As indicated in FIG. 6(B) when pins 410-1 and 410-2 are inserted into membrane 55, holes 58 and 59 are formed with diameters that correspond to the diameters of pins 410-1 and 410-2, respectively. In one practical embodiment, pins 410-1 having a diameter D1 of approximately 0.028 inches were used to produce pinholes 58 and pins 410-2 having a diameter D2 of approximately 0.062 inches were used to produce pinholes 59 (i.e., using a membrane 55 having a thickness of approximately 0.02 inches). Subsequently, as indicated in FIG. 6(C), when pins 410-1 and 410-2 are subsequently removed from membrane 55, flow control element is removed from the base structure (i.e., the tensile force in membrane 55 is released), and membrane 55 is subjected to normal atmospheric conditions, pinholes 58 and 59 are at least partially closed by the elastomeric membrane material surrounding each pinhole (e.g., as indicated by forces $F_{58}$ and $F_{59}$).

The present invention will now be described with reference to certain specific embodiments, each of which includes a wall section and elastic membrane formed according to the generalized embodiment described above.

Figure 7:
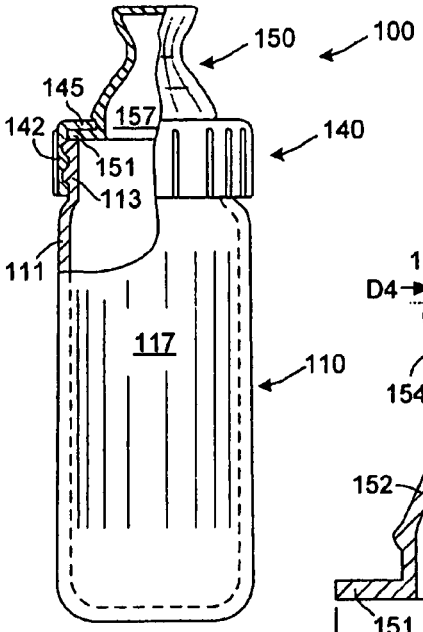
FIG. 7 is a partial cut-away side view showing a baby bottle assembly utilizing a nipple according to an exemplary embodiment of the present invention.

FIG. 7 is a partial cut-away side view showing a baby bottle assembly 100 including a nipple (flow control element) 150 formed in accordance with a first specific embodiment of the present invention. Baby bottle assembly 100 generally includes a substantially cylindrical bottle body 110 and a ring-shaped cap 140 for securing nipple 150 to bottle body 110. Bottle body 110 has a roughly cylindrical wall 111 and threaded upper neck 113 that define a beverage storage chamber 117 for storing a fluid beverage (i.e., infant formula or milk). Cap 140 includes a cylindrical base portion 142 having threaded inside surface, and a disk-shaped upper portion 145 defining a central opening through which a portion of nipple 150 extends. When cap 140 is connected (screwed) onto bottle body 110, the threads formed on cylindrical base portion 142 mate with threaded neck 113. Bottle body 110 and cap 140 are molded from a suitable plastic using known methods.

Figure 8:
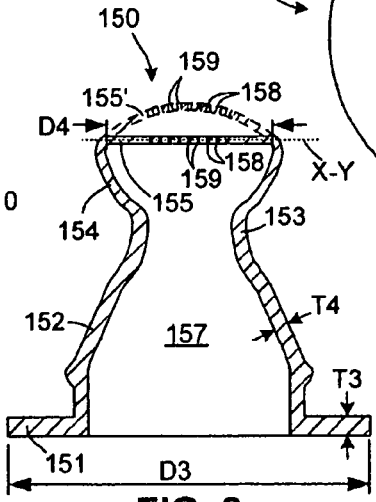
FIG. 8 is a cross-sectional side view showing the nipple used on the baby bottle of FIG. 7.
Figure 9:
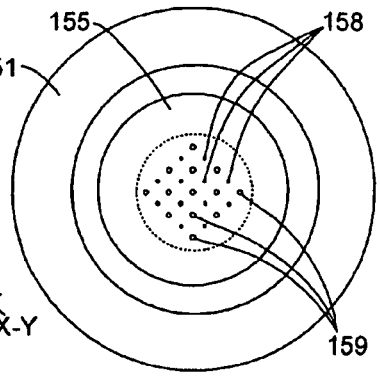
FIG. 9 is a top plan view of the nipple shown in FIG. 8.

Referring to FIGS. 8 and 9, nipple 150 includes a lower disk-shaped flange 151, a lower conical wall section 152 extending upward from flange 151, a neck region 153 formed above lower conical wall section 152, an upper conical wall section 154 extending upward from neck region 153, and a substantially flat, disk-shaped upper membrane 155 located at the upper portion of upper conical wall section 154. Lower conical wall section 152, neck region 153, upper conical region 154, and membrane 155 define an interior chamber 157. As indicted in FIG. 1, when mounted in bottle assembly 100, a ring-shaped portion of flange 151 is pinched between an upper edge of neck 113 and a portion of upper portion 145 of cap 140, and interior chamber 157 of nipple 150 communicates with storage chamber 117 of bottle body 110. Lower conical wall section 152 extends through the opening defined in disk-shaped upper portion 145 of cap 140, and gradually tapers from a relatively wide diameter near flange 151 to a relatively narrow diameter D2 at neck region 153. Above neck region 153, upper conical wall section 154 again widens to a third, relatively wide diameter D3, which corresponds with the diameter of disk-shaped upper membrane 155. Flange 151 and conical sections 152 and 154 are formed using relatively thick sections of the elastomeric material, in comparison to membrane 155, which is relatively thin. In one embodiment, nipple 150 is molded as a single integral piece using silicone. In this embodiment, flange 151 has a thickness T3 of approximately 0.1 inches and a diameter D3 of approximately 2 inches, lower conical wall section 154 has a thickness T4 of approximately 0.06 inches, and membrane 155 has a diameter D4 of approximately 0.75 inches and thickness of approximately 0.02 inches. As indicated in FIG. 8, during use (e.g., when an infant/child sucks on nipple 150 with bottle body 110 tipped such that liquid flows into nipple chamber 157), a pressure differential is generated such that a relatively high pressure inside storage chamber 117 becomes greater than a relatively low pressure in the infant/child's mouth, thereby causing membrane 155' to stretch upward from plane X-Y in the manner described above, thereby opening at least some of pinholes 158 and 159 to facilitate feeding.

Figure 10:
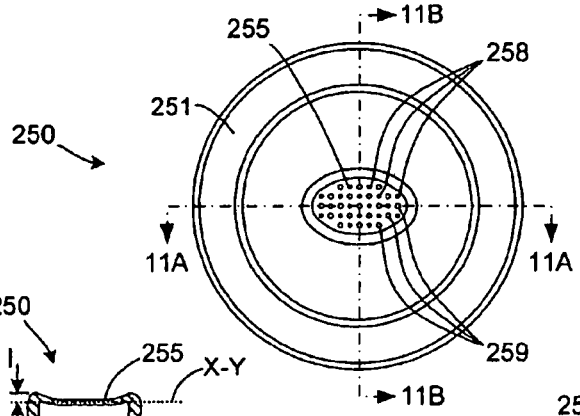
FIG. 10 is a top plan view showing a nipple according to another exemplary embodiment of the present invention.
Figure 11A:
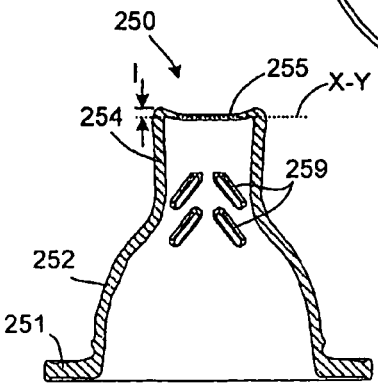
FIGS. 11(A) and 11(B) are cross-sectional side views of the nipple shown in FIG. 10.
Figure 11B:
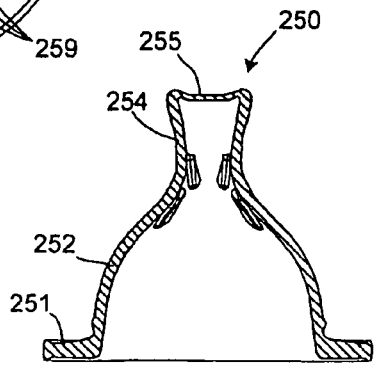

FIGS. 10, 11(A) and 11(B) show a nipple 250 according to another specific embodiment of the present invention. Nipple 250 includes a lower flange 251, a lower wall section 252 extending upward from flange 251, an oval neck structure 254 extending upward from lower wall section 252, and an flat oval membrane 255 formed at an upper edge of neck structure 254. The dimensions and thicknesses associated with nipple 250 are similar to those described above with reference to the first embodiment. Also, similar to the first embodiment, membrane 255 is essentially flat such that it defines plane X-Y. Note that, due to the smaller size of membrane 255 (i.e., approximately one-half inch along the short axis and three-quarters of an inch along the long axis), the number of holes 258 formed therein is smaller (e.g., thirty-seven, with nineteen larger pinholes 259 and eighteen smaller pinholes 258). To compensate for the smaller number of pinholes, the membrane thickness may be reduced (e.g., to 0.015 inches) to facilitate the same fluid flow, as compared to that of thicker membranes having a larger number of pinholes. Note also that stiffening ribs 259 may be integrally molded on the inside of neck structure 254 to resist collapse of nipple 250 during use. In one embodiment, membrane 255 is indented by an amount I (e.g., 0.015 inches) below the uppermost portion of neck structure 254.

Figure 12:
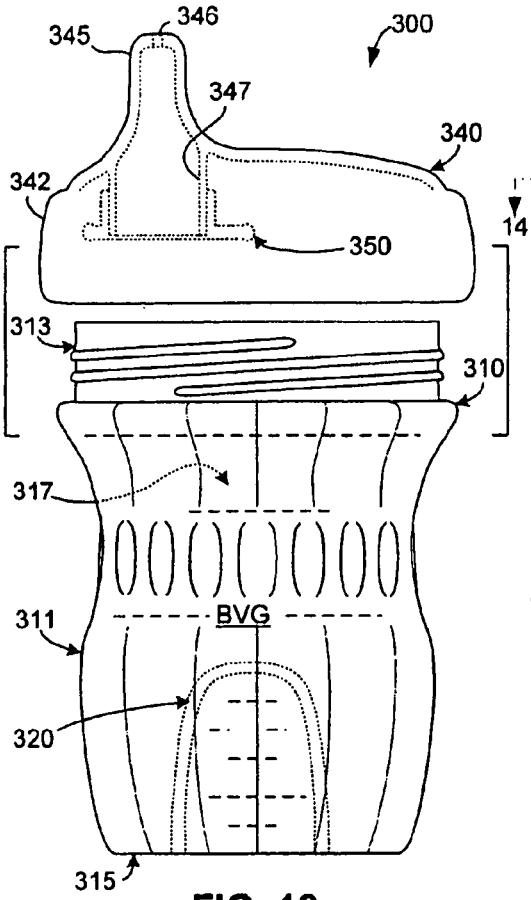
FIG. 12 is a side view showing a sippy cup including a flow control element according to another exemplary embodiment of the present invention.

FIG. 12 is a side view showing a sippy cup 300 that utilizes a flow control element 350 formed in accordance with another specific embodiment of the present invention. Sippy cup 300 generally includes a hollow cup-shaped body 310, and a cap 340 having flow control element 350 mounted thereon. Body 310 includes a roughly cylindrical sidewall 311 having a threaded upper edge 313, and a bottom wall 315 located at a lower edge of sidewall 311. Sidewall 311 and bottom wall 315 define a beverage storage chamber 317 in which a beverage BVG is received during use. An optional cold plug 320 is mounted on bottom wall 315, as described in co-owned U.S. Pat. No. 6,502,418 issued Jan. 7, 2003. Cap 340 includes a base portion 342 having threaded inside surface that mates with threaded upper edge 313 to connect cap 340 to body 310, thereby enclosing storage chamber 317. Cap 340 also includes a drinking spout 345 defining an outlet passage 346. Provided at a lower end of drinking spout 345 is a cylindrical mounting structure 347 to which flow control element 350 is press fitted. Cylindrical mounting structure 347 forms a flow channel through which liquid passes from storage chamber 317 to outlet passage 346.

Figure 13:
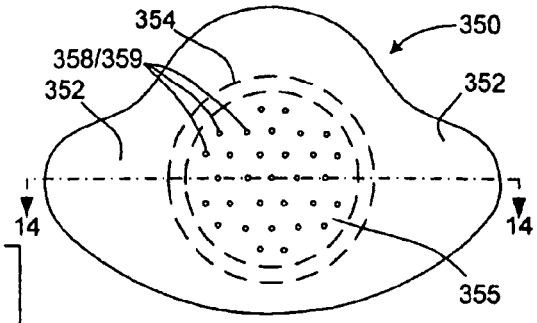
FIG. 13 is a plan view showing the flow control element utilized in the sippy cup of FIG. 12.
Figure 14:
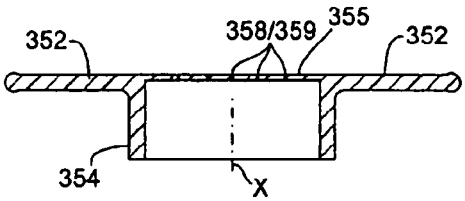
FIG. 14 is a cross-sectional side view taken along section line 14-14 of FIG. 13.

Referring to FIGS. 13 and 14, flow control element 350 is formed according to the generalized embodiment described above, and includes several peripheral pull-tabs 352, a cylindrical wall section 354 extending away from pull-tabs 352, and a membrane 355 extending across one end of cylindrical wall 354. Pull-taps 352 are formed by a flat, relatively thick section of the elastomeric material, and provide convenient handles for removing flow control element 350 from cap 340. Cylindrical wall 354 is also relatively thick, and defines a central axis X that extends substantially perpendicular to the plane defined by pull-tabs 352. In contrast, membrane 155 is relatively-thin, and in the disclosed embodiment is located in the plane defined by pull-tabs 352. In accordance with the present invention, several pinholes 358 and 359 are formed in the manner described above with reference to pinholes 58 and 59 of the generalized embodiment to facilitate liquid flow from storage chamber 317 through drinking spout 345 in the manner described above.

Figure 15:
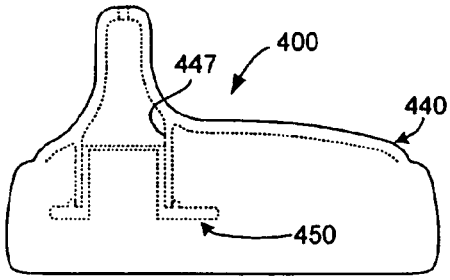
FIG. 15 is a side view showing a portion of a sippy cup including a flow control element according to another exemplary embodiment of the present invention.

FIG. 15 is a side view showing a portion of a sippy cup 400 according to yet another embodiment of the present invention. Similar to the first embodiment discussed above, sippy cup 400 utilizes a cap 440 and body (not shown) that are similar to cap 340 and body 310, which are described above. However, sippy cup 400 utilizes an elastomeric flow control element 450 mounted on cap 440 that differs from flow control element 350 in the manner described below.

Figure 16:
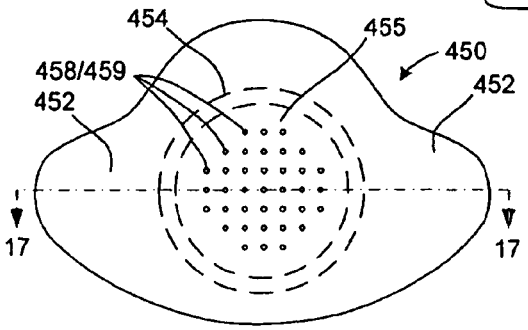
FIG. 16 is a plan view showing the flow control element utilized in the sippy cup of FIG. 15.
Figure 17:
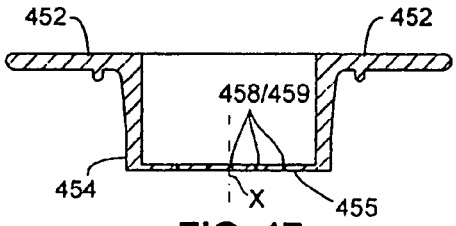
FIG. 17 is a cross-sectional side view taken along section line 17-17 of FIG. 16.

Referring to FIGS. 16 and 17, flow control element 450 is formed from a suitable elastomeric material (e.g., soft rubber, thermoplastic elastomer, or silicone), and includes several peripheral pull-tabs 452, a cylindrical wall 454 extending away from pull-tabs 452, and a membrane 455 extending across the end of cylindrical wall 454 that is located opposite to pull-tabs 452. Similar to the above-described sippy cup embodiment, pull-taps 452 are formed by a flat, relatively thick section of the elastomeric material. However, membrane 455 is positioned below the plane formed by tabs 452 (i.e., at a lower end of wall 454). The outer diameter of cylindrical wall 454 is provided with a slight taper (as indicated in FIG. 16) to facilitate insertions into cylindrical mounting structure 447 of cap 440 (as shown in FIG. 15), and is sized to be secured (i.e., press fitted) to cap 440 when cylindrical wall 454 is pushed into mounting structure 447. As in the embodiment described above, flow control element 450 includes pinholes 458 and 459 that are formed in the essentially the same manner described above to facilitate different flow rates at different applied differential pressures.

In addition to the general and specific embodiments disclosed herein, other features and aspects may be added to the novel flow control elements that fall within the spirit and scope of the present invention. Therefore, the invention is limited only by the following claims.

What is claimed is:

1. A flow control element for controlling the flow of a liquid *between a first region and a second region of a wall section*, the flow control element comprising:

[a tube-like wall section having a first end and a second end, the wall section defining a liquid flow channel extending from the first end to the second end of the wall section; and]

a substantially flat, *elastic* membrane *including a perimeter, wherein the perimeter of the membrane is* connected to the wall section such that the membrane is disposed between *the first region and the second region in the flow path of* the liquid [flow channel and an external region located outside of the flow control element], wherein the membrane defines a plurality of pinholes that are formed such that when the membrane is subjected to normal atmospheric conditions and the membrane remains undeformed, the plurality of pinholes remain closed to prevent liquid flow between the [liquid flow channel] *first region* and the [external] *second* region through the membrane, and when the membrane is deformed in response to an applied pressure differential between the [liquid flow channel] *first region* and the [external] *second* region, the plurality of pinholes open to facilitate [liquid] flow *of said liquid* through the membrane.

2. The flow control element according to claim 1, wherein the wall section defines a central axis, and wherein the membrane is [and] arranged perpendicular to the central axis.

3. The flow control element according to claim 1, wherein the plurality of pinholes are arranged in a two-dimensional pattern.

4. The flow control element according to claim [1] *2*, wherein the wall section has a greater rigidity than the membrane such that, when an applied pressure differential is generated between the [liquid flow channel] *first region* and the [external] *second* region, the membrane undergoes a greater deformation than the wall section.

5. The flow control element according to claim 4, wherein the membrane and the wall section form an integrally molded structure comprising at least one of silicone, a thermoplastic elastomer, and soft rubber, and wherein the wall section has a first thickness that is greater than a second thickness of the membrane.

6. The flow control element according to claim 4, wherein the wall section is formed from a [first,] relatively rigid material[, and wherein the membrane is formed from a second, relatively elastic material].

7. The flow control element according to claim 1, wherein the flow control element comprises a nipple for a baby bottle.

8. The flow control element according to claim 1, wherein the flow control element comprises a valve for a sippy cup.

9. A flow control element for controlling the flow of a liquid *between a first region and a second region of a wall section*, the flow control element comprising:

[a tube-like wall section having a first end and a second end, the wall section defining a liquid flow channel extending from the first end to the second end of the wall section; and]

a substantially flat, *elastic* membrane *including a perimeter, wherein the perimeter of the membrane is* connected to the wall section such that the membrane is disposed between [the liquid flow channel and an external region located outside of the flow control element] *the first region and the second region*, wherein the membrane defines a plurality of pinholes that are formed such that when the membrane is subjected to normal atmospheric conditions and the membrane remains undeformed, the plurality of pinholes remain closed to prevent liquid flow between the [liquid flow channel] *first region* and the [external] *second* region through the membrane, and when the membrane is deformed in response to an applied pressure differential between the [liquid flow channel] *first region* and the [external] *second* region, the plurality of pinholes open to facilitate liquid flow through the membrane, and wherein the plurality of pinholes include a first pinhole and a second pinhole that are formed such that when the membrane is subjected to a first, relatively low applied pressure differential, the first pinhole remains closed and the second pinhole opens to facilitate a first, relatively low liquid flow rate through the membrane, and when the membrane is subjected to a second, relatively high applied pressure differential, both the first pinhole and the second pinhole open to facilitate a second, relatively high liquid flow rate through the membrane.

10. A flow control element for controlling the flow of a liquid, the flow control element comprising:

a wall section surrounding a liquid flow channel; and a substantially flat elastic membrane connected to the wall section and extending across the liquid flow channel, wherein the elastic membrane defines a plurality of first pinholes and a plurality of second pinholes, wherein said pluralities of first pinholes and second pinholes are formed such that:

when the membrane is subjected to normal atmospheric conditions, both the first pinholes and the second pinholes remain closed to prevent liquid flow from the liquid flow channel through the membrane, when the membrane is subjected to a first, relatively low applied pressure differential, the first pinholes remain closed and the second pinholes open to facilitate a first, relatively low liquid flow rate through the membrane, and when the membrane is subjected to a second, relatively high applied pressure differential, both the first pinholes and the second pinholes open to facilitate a second, relatively high liquid flow rate through the membrane.

11. The flow control element according to claim 10, wherein the wall section defines a *longitudinal* central axis, and wherein the elastic membrane is [and] arranged perpendicular to the central axis.

12. The flow control element according to claim 10, wherein the first and second pinholes are arranged in a two-dimensional pattern.

13. The flow control element according to claim 10, wherein the wall section has a greater rigidity than the elastic membrane such that, when an applied pressure differential is generated between the liquid flow channel and an external region, the membrane undergoes a greater deformation than the wall section.

14. The flow control element according to claim 13, wherein the membrane and the wall section form an integrally molded structure comprising at least one of silicone, a thermoplastic elastomer, and soft rubber, and wherein the wall section has a first thickness that is greater than a second thickness of the membrane.

15. The flow control element according to claim 13, wherein the wall section is formed from a first, relatively rigid material, and wherein the membrane is formed from a second, relatively elastic material.

16. The flow control element according to claim 10, wherein the flow control element comprises a nipple for a baby bottle.

17. The flow control element according to claim 10, wherein the flow control element comprises a valve for a sippy cup.

18. A method for manufacturing a flow control element, the flow control element including a tube-like wall section surrounding a fluid flow channel, and an elastic membrane *defining a radial axis, the membrane being* integrally formed with the wall section [and extending across the fluid flow channel], the method comprising:

stretching the elastic membrane by applying a tensile force along the radial axis;

piercing the stretched elastic membrane using a plurality of pins, thereby forming a plurality of pinholes; and removing the plurality of pins and releasing the tensile force, whereby each of the plurality of pinholes is closed by elastomeric material surrounding said each pinhole and the elastic membrane is subjected to normal atmospheric conditions, wherein piercing comprises inserting a first pin having a first diameter into the stretched elastic membrane to form a first pinhole, and inserting a second pin having a second diameter into the stretched elastic membrane to form a second pinhole, wherein the first diameter is smaller than the second diameter.

* * * * *